CONTROL APPARATUS

Filed Jan. 25, 1965

INVENTORS
GERHARD A. KLADDE
JACKIE R. MEYER
BY
Bruce C Lutz
ATTORNEY

United States Patent Office 3,379,982

Patented Apr. 23, 1968

3,379,982
CONTROL APPARATUS

Gerhard A. Kladde, Rochester, N.Y., and Jackie, R. Meyer, Minneapolis, Minn., assignors to Honeywell Inc., a corporation of Delaware Filed Jan. 25, 1965, Ser. No. 427,878
2 Claims. (Cl. 328—143)

ABSTRACT OF THE DISCLOSURE

A function generator for providing an output which corresponds to a signal having the greatest potential difference from a biasing means wherein the signal being compared is obtained from different gain amplifiers.

This invention is directed generally toward apparatus for generating output signals and is more particularly directed to apparatus for providing prescribed output signals in response to an easily produced variable input signal.

The field of function generating apparatus in which the present invention resides is somewhat crowded with many different types of apparatus for producing nonlinear output signals. However, the apparatus which uses electronics generally will not provide sharp changes in slope in the output signal and even the circuits which do have a sharp transition point are not able to stabilize the voltage level of this point under varying environmental conditions. While mechanical apparatus can be produced which will produce sharp changes in the output signal, this apparatus is somewhat bulky and heavy. The present invention is easily adaptable to be produced in microminiaturized circuit versions and therefore overcomes the main objections of prior art function generators in that the units can be made very small and light.

It is an object of this invention to provide improved function generating apparatus.

Further objects and advantages of this invention may be ascertained from a reading of the specification and appended claims along with the drawings in which:

Figure 1:
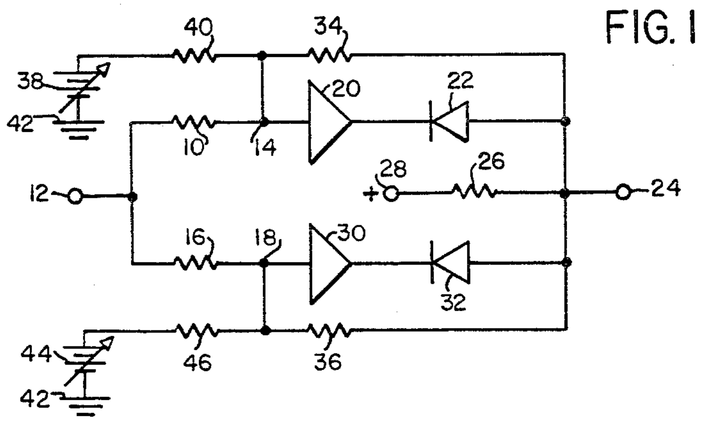
FIGURE 1 is a block circuit diagram of a simple version of a function generator.

In FIGURE 1 a resistor 10 is connected between an input 12 and a junction point 14. Input 12 is utilized to receive input signals of predetermined characteristics such as a linear ramp signal. A second resistor 16 is connected between input 12 and a second junction point 18. An input of an amplifier 20 is connected to junction point 14 while an output of amplifier 20 is connected to a cathode of a diode 22. By definition in this specification, the direction of easy current flow through a diode will be from anode to cathode. The anode of diode 22 is connected to an output terminal 24 of the apparatus. A resistance element 26 is connected between terminal 24 and a source voltage 28 which in this case is a positive potential and may be called biasing means. An amplifier 30 has an input connected to junction point 18 and an output connected to a cathode of a diode 32. The anode of diode 32 is connected to output 24. The diodes 22 and 32 may also be referred to as diode switch means or switching means. A feedback resistor 34 is connected between output 24 and junction point 14 and, when diode 22 is conducting, is the feedback resistor for amplifier 20. A feedback resistor 36 is connected between output 24 and junction point 18 and is the feedback resistor for amplifier 30 when diode 32 is in a conducting condition. A variable biasing means or voltage supply means 38 is connected in series with a resistor 40 between junction point 14 and ground or reference potential 42. A second variable biasing means or voltage supply means 44 is connected in series with a resistor 46 between junction point 18 and ground or reference 42.

Figure 2:
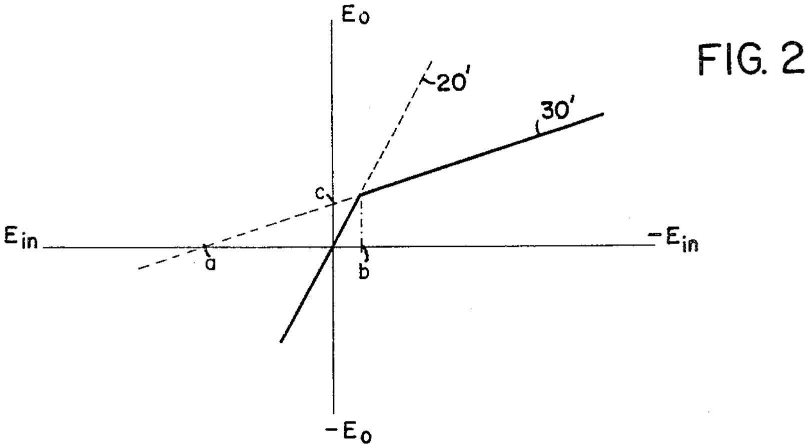
FIGURE 2 is a graph illustrating a general type of output obtained from the circuit of FIGURE 1.

In FIGURE 2 a graph is shown with horizontal coordinates of negative $E_{in}$ and positive $E_{in}$ with vertical coordinates of the positive $E_o$ and negative $E_o$. On this graph there are shown two intersecting lines 20′ and 30′ which are intended to illustrate the gain slopes of the amplifiers 20 and 30 respectively. Line 30′ intersects the $E_{in}$ coordinate at *a*, the line 20′ at *b* and the $E_o$ coordinate at *c*. Line 20′ intersects both coordinates at their intersections or zero points. If the diodes were removed from the circuit of FIGURE 1 and the outputs of the two amplifiers were not connected together, amplifier 20 would provide the output shown in both the solid and dashed connected lines 20′ assuming given conditions of the resistors as shown and the source voltage 38. The same would be true for the amplifier 30 as applies to line 30′. As will be later described, the circuitry is set up such that amplifier 20 will provide an output signal to output means 24 up to the time that the input voltage reaches a value of *b* as illustrated on the graph. At this time momentarily both amplifiers will apply their outputs to output 24. Beyond this point in time amplifier 30 will provide the output signal to output 24 of the function generating apparatus.

Figure 3:
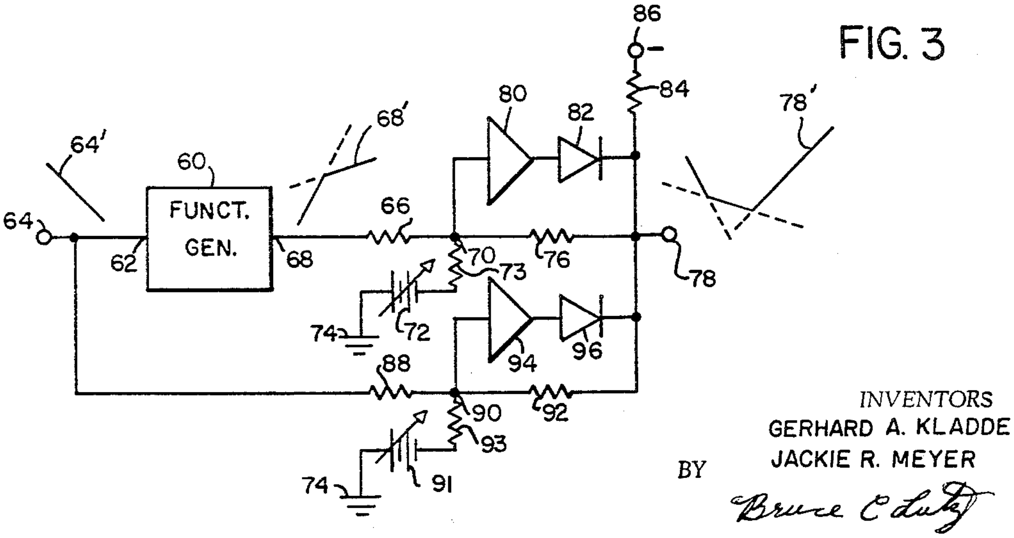
FIGURE 3 is a somewhat more complex version of the function generator incorporating in part the teachings of FIGURE 1.

In FIGURE 3 the function generator 60 has an input 62 connected to an input means 64 of the apparatus shown in FIGURE 3. Function generator 60 is essentially the apparatus shown and described in connection with FIGURE 1. A resistive element or impedance means 66 is connected between an output 68 of function generator 60 and a junction point 70. A variable voltage means or biasing means 72 is connected in series with an impedance means 73 between junction point 70 and ground or reference potential 74. A feedback resistor 76 is connected between junction point 70 and output terminal 78. An amplifier 80 is connected in series with a diode means or switching means 82 between junction point 70 and output 78. Diode 82 is connected such that the direction of easy current flow is toward output 78. A resistive element or impedance means 84 is connected between output 78 and a source of biasing voltage 86. In this figure biasing source 86 is shown as a negative voltage. An input resistor, summing resistor or impedance means 88 is connected between input 64 of the apparatus and a junction point 90. A variable voltage supply means or biasing means 91 is connected in series with an impedance means 93 between junction point 90 and ground or reference potential 74. A feedback resistor 92 is connected between junction point 90 and output 78. An amplifier 94 is connected in series with a diode means or switching means 96 between junction point 90 and output 78. Diode means 96 is connected in the circuit such that the direction of easy current flow is toward output 78. Additionally in FIGURE 3 there are shown several signals which are numbered 64′ to show the input applied at input 64, 68′ to show the output obtained at the output of function generator 60 and 78′ to show the output obtained at output 78 of the function generating apparatus. These outputs again will be further described during the explanation of operation of FIGURE 3.

In explaining the operation of FIGURE 1 it will be assumed that the biasing means 44 can supply either positive or negative voltage. Further it will be assumed that the biasing means 44 is biased in the negative direction such that the current to amplifier 30 through the summing resistor or impedance means 46 with zero input signal voltage applied to input 12 will cause the amplifier 30 to provide an output corresponding to the point *c* on the graph of FIGURE 2. Stated differently, the input signal will have to have a positive input in the amount of *a* as shown on the graph of FIGURE 2 in order for the amplifier 30 to have a zero output potential. As will be further noted, the biasing means 38 is adjusted so that there is no output potential and thus amplifier 20 will not supply any output signal with a zero or minimum signal level applied at input 12. As previously mentioned, the biasing voltage applied to terminal 28 is positive. Therefore with a zero input signal applied at 12 and further with the biasing voltages received from biasing means 38 and 44, the amplifier 20 will attempt to provide a zero output potential and the amplifier 30 will attempt to provide an output potential in the amount of the value shown as *c*. Since the output at amplifier 20 is lower than the supply or biasing voltage applied to junction point 28 there will be current flow through resistive means 26 and diode 22 to the output of amplifier 20. The output 24 will therefore be at a potential near ground or zero potential. This will result in diode 32 being reverse biased or back biased. If diode 32 is reversed biased the output of amplifier 30 will have no effect on the output 24 of the apparatus. Further, diode 32 in the reverse biased condition will prevent feedback from output to input of amplifier means 30 through the feedback resistor 36 and in the absence of this feedback the output of amplifier 30 will increase to a maximum value.

If the output is now raised in potential the output at 24 will follow the slope of the dark line between zero output and the output obtained when the input signal reaches the point *b* on the graph of FIGURE 2. At this point the outputs obtained from the two amplifiers are rendered effective. When the input signal becomes slightly greater than that shown as *b*, the diode 22 is reverse biased and amplifier 20 is then rendered ineffective from providing further outputs to the output 24 and current flows instead through diode 32 into the output of amplifier 30. As can thus be seen, the diodes act as switching means to allow only the output from the amplifier having the lowest potential or the potential which is the greatest difference between supply 28 and the output of the amplifiers to be applied to output 24 of the function generating apparatus. If the supply 28 were of a negative potential and if the connection of diodes 22 and 32 were reversed, then the output of the amplifier having the highest potential would be applied to the output 24.

When high gain amplifiers are utilized, the feedback through resistors 34 and 36 renders the outputs obtained very stable. Further, the switching action of diodes 22 and 32 render a very sharp break in the output signal supplied to output means 24 thus providing improved operation over prior art function generators. Another improvement not immediately obvious is the placement of the diode. Since the output is taken from between the diode and the rest of the feedback network, the changes in output due to temperature effects on the diodes are reduced to a minimum value much below that obtained when the output was taken between the amplifier and the diode. This further tends to stabilize the voltage at which the transition point occurs and provides an improvement over the prior art devices.

It has been assumed in describing the operation of these circuits that the amplifiers utilized are of a negative gain. In other words it is assumed that, if a positive going input is supplied to one of these amplifiers, a negative going output will be obtained. With this assumption, it will be noticed in FIGURE 3 that a negative going input supplied to input 64 provides a characterized positive going output at output 68 of the function generator 60. This output 68' is similar to that shown in FIGURE 2. If output 68' and input 64' are then applied to the further function generating apparatus shown in the form of amplifiers 80 and 94, the diodes 82 and 96 will act as switches so as to prevent the outputs from the amplifiers from reaching output 78 as long as the diodes are reverse biased. As shown, the diode 96 is initially reverse biased since input 64' to amplifier 94 does not porvide a large enough positive going output to equal or exceed the output from amplifier 80. Thus, the output of amplifier 80 flows through resistor 84 to negative biasing source 86. After a time the output from amplifier 94 equals the output from amplifier 80 and at this point diode 82 becomes reverse biased and the output from amplifier 94 is supplied to output 78.

It can thus be seen that the outputs from this function generating apparatus can not only change in slope but can change in polarity of the slope. In other words, the output can for a period of time change in a negative slope with a linear constantly changing input and yet after a period of time change to a positive slope. Many variations will occur to those skilled in the art for obtaining many different types of functions and it is considered to be within the scope of this invention to include all the various means of practicing this invention. While the specification and drawings have illustrated only the basic embodiment of the invention and a slightly more complicated version for producing both negative and positive polarity outputs, the invention is not intended to be limited thereby but only by the appended claims in which—

We claim:

1. Function generating apparatus for producing a non-linear output signal in response to a linear input signal comprising, in combination:

first high gain amplifier means;

second high gain amplifier means;

input means for supplying an input signal to said function generating apparatus;

output means for providing a non-linear output signal from said function generating apparatus;

first and second resistive means connected in series between said input means and said output means;

means connecting an intermediate point between said first and second resistance means to an input of said first amplifier means, said first and second resistance means determining a gain slope for said first amplifier means;

third and fourth resistive means connected in series between said input means and said output means;

means connecting an intermediate point between said third and fourth resistance means to an input of said second amplifier means, said third and fourth resistance means determining a different gain slope for said second amplifier means;

first and second biasing means, independent of said input means connected to said first and second amplifier input means respectively for summing with said input signal and for providing predetermined different outputs from said first and second amplifier means; and first and second diode means connected between said function generating apparatus output means and outputs of said first and second amplifier means respectively for allowing only the smallest absolute amplitude output signal to be applied to said output means of said function generating apparatus.

2. Function generating apparatus for producing a non-linear output signal in response to a linear input signal comprising, in combination:

first high gain amplifier means;

second high gain amplifier means;

input means for supplying an input signal to said function generating apparatus;

output means for providing a non-linear output signal from said function generating apparatus;

first and second resistive means connected in series between said input means and said output means;

means connecting an intermediate point between said first and second resistance means to an input of said first amplifier means, said first and second resistance means determining a gain slope for said first amplifier means;

third and fourth resistive means connected in series between said input means and said output means;

means connecting an intermediate point between said third and fourth resistance means to an input of said second amplifier means, said third and fourth resistance means determining a different gain slope for said second amplifier means;

first and second biasing means, independent of said input means, connected to said first and second amplifier input means respectively for summing with said input signal and for providing predetermined different outputs from said first and second amplifier means; and first and second asymmetrical conducting means connected between said function generating apparatus output means and outputs of said first and second amplifier means respectively for allowing only the smallest absolute amplitude output signal to be applied to said output means of said function generating apparatus.

References Cited

UNITED STATES PATENTS

| | | | |
|---|---|---|---|
| 2,978,645 | 4/1961 | Tedford | 328—154 |
| 3,089,093 | 5/1963 | Rochester | 328—143 |
| 3,031,142 | 4/1962 | Cohen et al. | 307—88.5 |
| 3,204,118 | 8/1965 | Rotier | 307—88.5 |

ARTHUR GAUSS, *Primary Examiner.*

H. DIXON, *Assistant Examiner.*